United States Patent
De Campo et al.

(10) Patent No.: US 8,883,901 B2
(45) Date of Patent: Nov. 11, 2014

(54) PROCESS FOR STABILIZING HYPOPHOSPHITE SALTS

(75) Inventors: Floryan De Campo, Shanghai (CN); Annelyse Murillo, Shanghai (CN); Junli Li, Shanghai (CN); Tingting Zhang, Shanghai (CN)

(73) Assignee: Solvay (China) Co., Ltd., Shanghai (CN)

( * ) Notice: Subject to any disclaimer, the term of this patent is extended or adjusted under 35 U.S.C. 154(b) by 0 days.

(21) Appl. No.: 13/392,304

(22) PCT Filed: Aug. 24, 2009

(86) PCT No.: PCT/CN2009/073464
§ 371 (c)(1),
(2), (4) Date: Feb. 24, 2012

(87) PCT Pub. No.: WO2011/022871
PCT Pub. Date: Mar. 3, 2011

(65) Prior Publication Data
US 2012/0149821 A1   Jun. 14, 2012

(51) Int. Cl.
C08K 3/32 (2006.01)
C09K 21/04 (2006.01)
C01B 25/165 (2006.01)

(52) U.S. Cl.
CPC . *C09K 21/04* (2013.01); *C08K 3/32* (2013.01); *C01B 25/165* (2013.01)

USPC ............................................... 524/414; 432/9

(58) Field of Classification Search
CPC ........ C01B 25/165; C08K 3/32; C09K 21/04; C09D 5/18
See application file for complete search history.

(56) References Cited

U.S. PATENT DOCUMENTS

| 4,328,132 A * | 5/1982 | Moberly ........................ 252/606 |
| 5,225,052 A | 7/1993 | Takikawa et al. |
| 2007/0173572 A1 | 7/2007 | Mediratta et al. |

FOREIGN PATENT DOCUMENTS

| CN | 1878829 | 12/2006 |
| CN | 1926192 | 3/2007 |
| CN | 1997698 | 7/2007 |
| CN | 101332982 | 7/2008 |
| CN | 101260226 | 9/2008 |
| CN | 101280105 | 10/2008 |
| WO | WO 2009010812 | 1/2009 |

* cited by examiner

*Primary Examiner* — Susannah Chung
*Assistant Examiner* — Robert T Butcher

(57) ABSTRACT

The current invention relates to a process for stabilizing a hypophosphite salt, comprising the step of heating the hypophosphite salt at a temperature of between 150 and 370° C. during a sufficient period of time to prevent the formation of a dangerous quantity of phosphine in their application as FR in polymers and a flame retardant polymer composition comprising a polymer and 0.1 to 30 weight percent based on the total weight of the composition of the hypophosphite salt thermally stabilized by the above process.

9 Claims, No Drawings

PROCESS FOR STABILIZING HYPOPHOSPHITE SALTS

CROSS-REFERENCE TO RELATED APPLICATIONS

This application is the U.S. National Phase of International Application No. PCT/CN2009/073464, filed on Aug. 24, 2009, which is incorporated herein by reference in its entirety.

FIELD OF THE INVENTION

The current invention relates to a process for stabilizing hypophosphite salts and more particularly to a process for stabilizing hypophosphite salts used as flame retardants (hereinafter also known as "FR").

BACKGROUND OF THE INVENTION

Halogen free flame retardant additives are of increasing interest in reinforced and un-reinforced polymers, more particularly thermoplastic polymers, for their ability to provide FR properties while remaining environmentally benign. Among those halogen free flame retardants, hypophosphite salts or inorganic phosphinates are known as good FR additives for polymers. However, phosphinic acid salts may cause the degradation of the polymer to which they are added as mentioned for example in WO 2009/010812. Moreover, hypophosphite salts are known to have a tendency to generate phosphines at elevated temperatures at which they are processed, and phosphines are spontaneously flammable, highly toxic and strong irritants as mentioned for example in U.S. 2007/0173572.

The proposed solution taught by U.S. 2007/0173572 is to scavenge the generated phosphines by adding a phosphine suppressing additive which can be a specific polymer, an amide, imide, cyanurate, phosphazine among other products. The drawback of that method is that another additive is added to the polymer composition which can only neutralize the phosphine without preventing the generation of that phosphine.

Thus, there exists a constant need in the market of FR agents in having hypophosphites salts without the above drawbacks and that premature instability or at a much lower degree. There is a need to propose hypophosphite salts sufficiently stabilized in order not to generate a dangerous amount of phosphine.

DETAILED DESCRIPTION OF THE INVENTION

In fact, after extensive research and development work, the Applicant has surprisingly found out and developed a stabilizing process for hypophosphite salts which can prevent or, at the very least, minimise, the formation of phosphine from hypophosphite salts, more particularly in their application as FR.

The current invention actually relates to a process for stabilizing a hypophosphite salt, comprising the step of heating the hypophosphite salt to a temperature of between 150 and 370° C., preferably between 190 and 290° C. under inert atmosphere.

That heating step is performed on the hypophosphite salt during a sufficient period of time to prevent the formation of a dangerous quantity of phosphines in their application as FR in polymers. That period of time can vary in a wide range depending upon the treatment temperature. Typically that range of time is of between one minute and 40 hours.

Normally, the longer the period of time, the lower the temperature. Typically, on average, that period of time is of about 30 min for a temperature of 290° C.

The process can be batch, continuous or semi-continuous, can be performed in a close or open system under inert atmosphere.

That inert atmosphere can be for example carbon dioxide, argon, or nitrogen.

The process of the invention can be performed under atmospheric pressure, under pressure or under vacuum.

Without linking the current invention to any theoretical rationale, it looks like most of the premature instability is due to the presence of the presence of problematic impurities. Thus it can be interesting to check the quality of the hypophosphite salts by detecting the remaining impurities using thermal analysis tools such as ARC (Adiabatic Reaction calorimeter) and TGA (Thermal Gravimetric Analysis).

The test can be carried out at any stage during the heating process described before.

The heating process can be improved by coupling the heating equipment with online analysis tools to measure and/or identify the impurities coining out during the stabilizing process.

The hypophosphite salt is of the formula (1):

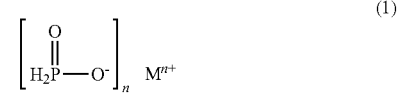

(1)

wherein n is 1, 2 or 3, and
M is a metal selected from the group consisting alkali metal, alkaline earth metal, aluminium, titanium and zinc. Preferably M is calcium or aluminium.

The hypophosphite salt to be treated can have been prepared by any manufacturing process. The hypophosphite salts and in particular, calcium hypophosphite, can be prepared for example from white phosphorus ($P_4$) reacted under alkaline conditions with calcium hydroxide or calcium oxide and water as taught by U.S. Pat. No. 5,225,052.

It is also possible to obtain calcium hypophosphite by reaction of a calcium salt or simply from lime as taught by Chinese patent CN101332982, with hypophosphorous acid. For example the lime suspension is simply neutralized with hypophosphorous acid, the impurities are removed by filtration and the product isolated in a same way as previously described.

Finally, it can also be possible to obtain calcium hypophosphite from other metallic hyphosphites or the acid by ion exchange process.

The invention also relates to the use of the stabilized hypophosphite salt for rendering polymers and more particularly, thermoplastic polymers, flame-retardant.

The invention relates to a flame retardant polymer composition comprising a polymer and 0.1 to 30 weight percent based on the total weight of the composition of a hypophosphite salt thermally stabilized by the process of the current invention.

The thermoplastic polymers are preferably, polyphenylene ethers, polyamides, polyesters, polycarbonates and blends or polymer blends. These include polymers of mono- or diolefins, for example polypropylene, polyisobutylene, of mono- or of diolefins with one another or with other vinyl monomers, polystyrene and their copolymers, halogen-containing polymers, e.g. polychloroprene, chlorinated rubber, polyacrylates and polymethacrylates, polyamides and copolyamides derived from diamines and from dicarboxylic acids and/or from aminocarboxylic acids or from the corresponding lactams.

Thermoplastic polymers can further comprise fillers and reinforcing materials and/or other additives, in order to obtain plastic molding compositions. The invention is further illustrated by the following examples.

EXAMPLES

Equipment

The furnace used for the experiments had the following technical specifications:
Temperature Range: 25/600° C.
Heating rates: 0/100° C./min
Cooling rates: 0/70° C./min
Temperature accuracy: 0.1° C.
Atmospheres: inert (static, dynamic)
Raw Materials For this study CaHypo was sourced from 2 different suppliers, SCRC and Linfeng. The two samples have been analyzed by typical analytical techniques and were found to be similar in quality. The two materials were also analyzed by TGA which is the recognized technique to evaluate the thermal stability of ingredients used in thermoplastics and the results showed that they have a similar profile. So, overall the materials appear to be similar both analytically and thermally. However, when these same products were heated into a furnace under inert atmosphere some signs of premature decomposition were observed as early as 315° C.

Examples 1

12 mg of Linfeng material was weighed into a crucible and then placed inside the furnace under static inert atmosphere. The sample was heated rapidly (<15 minutes) to 270° C. and this temperature was held up to 40 h. After the thermal aging the product was analyzed and was found to be composed mainly of CaHypo showing that the treatment did not alter CaHypo itself.

This same sample could then be heated under inert atmosphere in the furnace up to 370° C. before any signs of decomposition, showing at least a 50° C. increase of thermal stability.

Examples 2

11 mg of SCRC material was weighed into a crucible and then placed inside the furnace under static inert atmosphere. The sample was heated rapidly (<15 minutes) to 270° C. and this temperature was held up to 40 h. After the thermal aging the product was analyzed and was found to be composed mainly of CaHypo showing that the treatment did not alter CaHypo itself.

This same sample could then be heated under inert atmosphere in the furnace up to 370° C. before any signs of decomposition, showing at least a 50° C. increase of thermal stability.

Examples 3

12 mg of Linfeng material was weighed into a crucible and then placed inside the furnace under static inert atmosphere. The sample was heated rapidly (<15 minutes) to 290° C. and this temperature was held up for 40 h. After the thermal aging the product was analyzed and was found to be composed mainly of CaHypo showing that the treatment did not alter CaHypo itself.

This same sample could then be heated under inert atmosphere in the furnace up to 370° C. before any signs of decomposition, showing at least a 50° C. increase of thermal stability.

Example 4

A sample of CaHypo showing no signs of decomposition before 370° C. was prepared from Linfeng material. This sample, CaHypo HT, was compared with the original CaHypo Linfeng to determine the amount of phosphine generated at high temperature. In this experiment, 2 g of each sample were heated to 298° C. under a flow of argon. The out gases were captured into gas bags and the concentration of phosphine was measured over time using Caltec® tubes. The results gathered in Table 1 herein below clearly indicate that the amount of phosphine generated with CaHypo HT is up to 35 times lower which correspond to a 97% reduction of the amount of phosphine generated. These results show the improved thermal stability observed in the previous examples also translates into a significant lower generation of phosphine at high temperature.

TABLE 1

PH3 Generation Experiment

| | Total Phosphine generated (mL) | |
|---|---|---|
| Time | CaHypo Sample 2 | CaHypo-HT |
| 0.5 h | 0.17 | 0.01 |
| 1.5 h | 0.79 | 0.02 |
| 3.0 h | 2.15 | 0.06 |

2 g sample heated to 298° C. with argon flushing at rate 58 mL/mins.

Example 5

A larger sample of CaHypo HT, showing no signs of decomposition up to 370° C. was also tested to verify its FR properties. The product was compounded with a polyamide 6.6 resin on a microcompounder. The maximum processing temperature during the compounding was 280° C. and the resulting compound was press molded to prepare 0.95 mm specimen. Two samples were prepared containing respectively 10% and 20% of CaHypo HT and 30% of fiber glass the balance being the resin. Both samples were compounded without any issue and afforded good quality specimens that did not show any signs of degradation of the polymer or its additives.

The Glow-Wire Ignition Temperature (GWIT) was reached 775° C. measured according to standard IEC 60695-2-13 on the specimen and both specimens passed the test showing some FR properties.

The invention claimed is:

1. A process for stabilizing a flame retardant consisting of hypophosphite salt, comprising the step of heating the hypophosphite salt at a temperature ranging from 150 to 370° C. in an inert atmosphere.

2. The process of claim 1, wherein the temperature ranges from 190 to 290° C.

3. The process of claim 1, wherein said heating step is performed for a period of time ranging from one minute to 40 hours.

4. The process of claim 1, wherein said process comprises heating the hypophosphite salt in a closed system under inert atmosphere.

5. The process of claim 4, wherein the inert atmosphere comprises carbon dioxide, argon, nitrogen, or a mixture thereof.

6. The process of claim 1, comprising heating the hypophosphite salt under atmospheric pressure.

7. The process of claim 1, comprising heating the hypophosphite salt under a vacuum.

8. The process of claim 1, wherein the hypophosphite salt comprises a salt of formula:

wherein:
n is 1, 2, or 3, and
M comprises an alkali metal, an alkaline earth metal, aluminum, titanium, or zinc.

9. The process of claim 8, wherein M comprises calcium or aluminum.

* * * * *